(12) United States Patent
Bronicki et al.

(10) Patent No.: US 6,237,337 B1
(45) Date of Patent: *May 29, 2001

(54) RETROFIT EQUIPMENT FOR REDUCING THE CONSUMPTION OF FOSSIL FUEL BY A POWER PLANT USING SOLAR INSOLATION

(75) Inventors: Lucien Y. Bronicki, Yavne; Uriyel Fisher, Haifa; Chaim Sugarmen, Mevaseret Zion, all of (IL)

(73) Assignee: Ormat Industries Ltd., Yavne (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/150,665

(22) Filed: Sep. 10, 1998

(51) Int. Cl.$^7$ ...................................................... F03G 6/00

(52) U.S. Cl. ..................... 60/641.12; 60/39.182

(58) Field of Search .................. 123/39.182, 39.183, 123/641.8, 641.12, 641.14

(56) References Cited

U.S. PATENT DOCUMENTS 5,904,138  * 5/1999  Keintzel et al. ...................... 126/617

FOREIGN PATENT DOCUMENTS

19652349  * 6/1998  (DE).

OTHER PUBLICATIONS

Doron, P. ed., "From Basic Research to Industry," Sun Day Symposium, (title page, table of contents and foreward) May 1996.*

Sagie, D., "An Overview of Rotem's Activities in the Development of A Volumetric Solar Termal Receiver," presented at Sun Day Symposium, (abstract and complete entry) May 1996.*

Fisher, U., "Heat to Power Conversion in the 'Beam Down' Solar System," presented at Sun Day Symposium, (abstract and complete entry) May 1996.*

(List continued on next page.)

Primary Examiner—Noah P. Kamen
(74) Attorney, Agent, or Firm—Nath & Associates PLLC; Gary M. Nath; Jerald L. Meyer

(57) ABSTRACT

Retrofit equipment includes an auxiliary gas turbine unit including an auxiliary compressor for compressing ambient air to produce compressed air, a solar collector that receives the compressed air for heating the same to produce heated compressed air, and an auxiliary turbine coupled to the auxiliary compressor and to an auxiliary generator for expanding the heated compressed air and driving the auxiliary compressor and auxiliary generator thereby producing power and hot exhaust gases. When solar insolation is available, a flow control selectively supplies the hot exhaust gases from the retrofit equipment to a boiler which is part of a conventional fossil fueled power plant. The boiler has heat exchanger coils containing water and receives hot exhaust gases for vaporizing water in the coils and producing steam which is supplied to a steam turbine coupled to a generator for expanding steam produced by the boiler, and driving the generator and producing power and expanded steam. A condenser condenses the expanded steam to condensate, and a pump returns the condensate to the boiler. When solar insolation is not available. e.g., during the night, the flow control supplies the boiler with hot gases from a primary gas turbine unit which includes a primary compressor that compresses ambient air to produce compressed air, and a combustor that receives the compressed air for burning fossil fuel and heating the compressed air to produce heated compressed air that is supplied to the primary turbine.

7 Claims, 4 Drawing Sheets

OTHER PUBLICATIONS

Epstein, M. et al.,"Results of a Feasibility Study on the Possible Use of the Solar Tower Technology at the Dead Sea Works," presented at Sun Day Symposium, () (abstract and complete entry) May 1996.*

Epstein M., "Solar Thermochemistry Activities at ehe Weizmann Institute of Science (WIS)," presented at Sun Day Symposium, (abstract and complete entry) May 1996.*

* cited by examiner

RETROFIT EQUIPMENT FOR REDUCING THE CONSUMPTION OF FOSSIL FUEL BY A POWER PLANT USING SOLAR INSOLATION

DESCRIPTION

1. Technical Field

This invention relates to retrofit equipment for reducing the consumption of fossil fuel by a power plant using solar insolation.

2. Background of the Invention

Because of the problem of global warming, the finite supply of fossil fuels, and the stigma associated with the use of nuclear energy, interest exists in developing equipment and processes that rely on renewable energy sources, and in particular, solar energy, for power generation. Probably many decades will pass, however, before the switch from fossil fuels is complete.

It is therefore an object of the present invention to reduce the costs as well as the time involved in switching to solar based power plants by retrofitting existing fossil fueled power plants with equipment based on solar technology. This will permit the gradual replacement of existing fossil fueled power plants with minimal risk and reduced capital expenses.

SUMMARY OF THE INVENTION

Retrofit equipment according to the present invention includes an auxiliary gas turbine unit including an auxiliary compressor for compressing ambient air to produce compressed air, a solar collector that receives the compressed air for heating the same to produce heated compressed air during solar insolation, and an auxiliary turbine coupled to the auxiliary compressor and to an auxiliary generator for expanding the heated compressed air and driving the auxiliary compressor and auxiliary generator thereby producing power and hot exhaust gases. When solar insolation is available, a flow control selectively supplies the hot exhaust gases from the retrofit equipment to a boiler which is part of a conventional fossil fueled power plant. The boiler has heat exchanger coils containing water and receives hot exhaust gases for vaporizing water in the coils and producing steam which is supplied to a steam turbine coupled to a generator for expanding steam produced by the boiler, and driving the generator and producing power and expanded steam. A condenser condenses the expanded steam to condensate, and a pump returns the condensate to the boiler. When solar insolation is not available, the flow control supplies the boiler with hot gases from a primary gas turbine unit which includes a primary compressor that compresses ambient air to produce compressed air, and a combustor that receives the compressed air for burning fossil fuel and heating the compressed air to produce heated compressed air that is supplied to the primary turbine.

At night and during cloudy days or other periods of inclement weather, the primary gas turbine unit is operational, and the secondary gas turbine is quiescent. In such case, the power plant operates by burning fossil fuel. During the day, the secondary gas turbine unit operates and the primary gas turbine unit is quiescent and no fossil fuel is burned, the flow control directing exhaust gases from the secondary gas turbine unit to the boiler.

Preferably, the boiler includes a conduit having an upstream end for receiving the hot exhaust gases which flow through the conduit to a downstream end through which the gases are vented to the atmosphere. The boiler also may include a combustion chamber for burning fuel and producing hot flue gases which interact with heat exchanger coils in the conduit for heating the steam condensate and producing steam that is supplied to the steam turbine. The cooling of the flue gases introduces a temperature gradient in the flue gases flowing in the conduit; and the hot exhaust gases are introduced into the conduit at a location where the temperature of the flue gases is approximately the same as the temperature of the hot exhaust gases.

Retrofit equipment according to the present invention may also include a secondary blower for pressurizing ambient air, and a solar collector that heats pressurized ambient air produced by the last mentioned blower for producing heated ambient air. During solar insolation, a flow control selectively supplies the heated ambient air from the retrofit equipment as secondary air to a combustion chamber adapted to receive primary air and fossil fuel which burns and produces combustion products. During the night, or in cloudy weather, the secondary blower is quiescent. The power plant also includes a primary blower which introduces secondary air into the combustion chamber producing hot flue gases that are received in the upstream end of a conduit. The flue gases flow through the conduit to a downstream end through which the flue gases are vented to the atmosphere. Heat exchanger coils containing water are positioned in the conduit transfer heat in the flue gases and produce steam that is supplied to a steam turbine coupled to a generator. The steam produced by the coils expands in the turbine and drives the generator producing power and expanded steam. A condenser condenses the expanded steam to condensate; and a pump returns the condensate to the coils.

BRIEF DESCRIPTION OF THE DRAWINGS

Embodiments of the present invention are described by way of example, and with reference to the accompanying drawing wherein.

DETAILED DESCRIPTION

Figure 1:
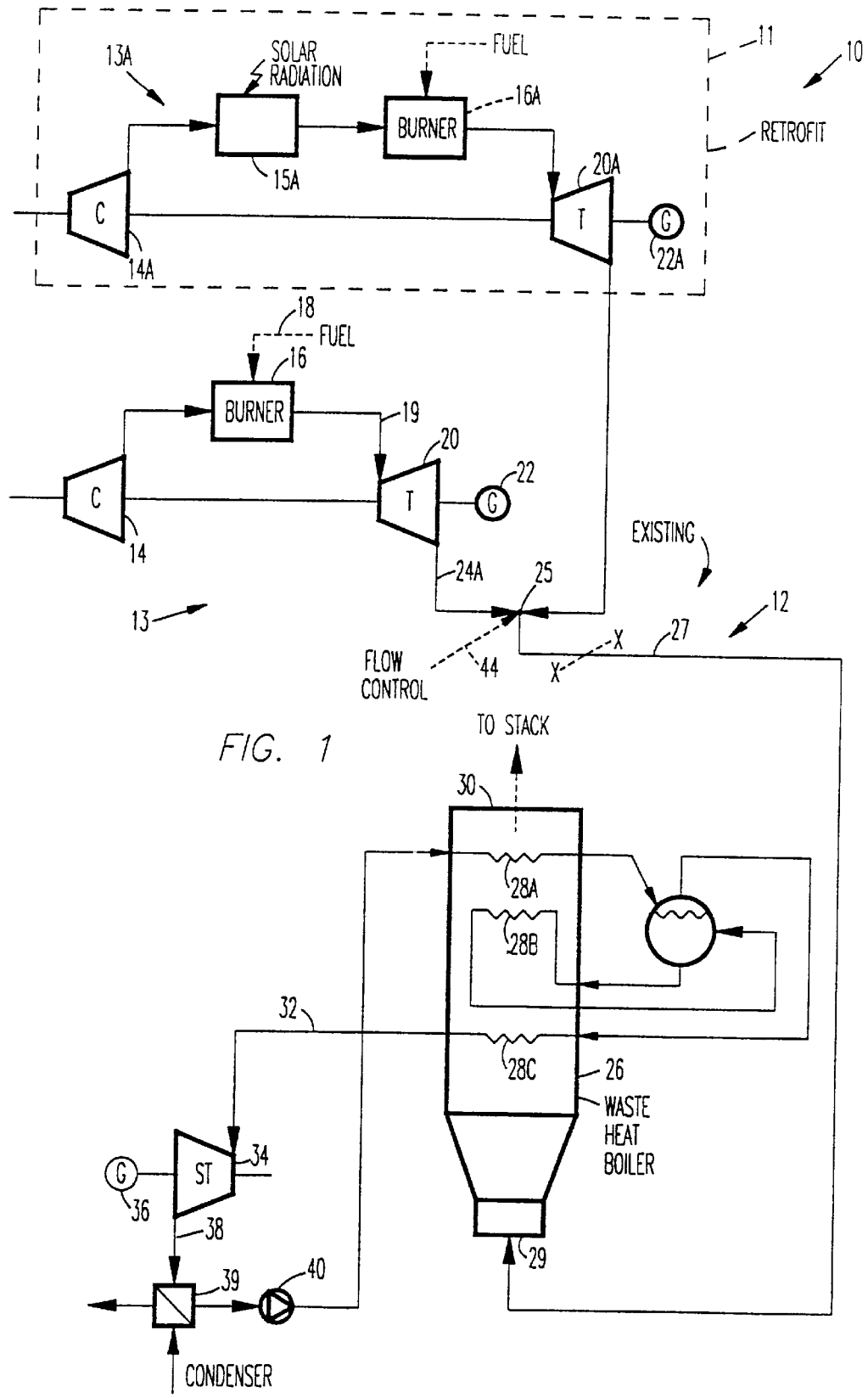
FIG. 1 is a schematic block diagram of one embodiment of the present invention.

Referring now to the drawings, reference numeral 10 designates a first embodiment of apparatus according to the present invention showing retrofit equipment 11 for reducing the consumption of fossil fuel by conventional combined-cycle power plant 12 using solar insolation. Power plant 12 includes primary gas turbine unit 13 including primary compressor 14 for compressing ambient air to produce compressed air that is applied to burner or combustor 16. Fossil fuel in line 18 feeds into burner 16 where combustion takes place heating the compressed air and producing heated compressed air in line 19 that is applied to primary turbine 20 coupled to primary compressor 14 and to primary generator 22. Turbine 20 expands the heated compressed air and drives the primary compressor and the primary generator thereby producing power and hot exhaust gases in line 24.

Power plant 12 also includes waste heat boiler in the form of conduit 26 having a series of heat exchanger coils 28A, 28B, and 28C containing water and receiving the hot exhaust gases in line 27 connected to line 24 at node 25. The hot exhaust gases are applied to the upstream end 29 of boiler 26, and these gases flow through the heat exchanger coils exiting the boiler at upstream end 30. After exiting the boiler, the then heat-depleted exhaust gases are vented to the atmosphere. Treatment of these cooled gases for environmental purposes may take place before venting.

Vaporization of water in the heat exchange coils takes place in a single stage, or multiple stages as shown, producing steam in line 32 which is applied to steam turbine 34 coupled to generator 36. Turbine 34 expands the steam and drives generator 36 producing power from the generator and expanded steam from the turbine exhaust in line 38. Condenser 39 condenses the expanded steam to condensate; and pump 40 returns the condensate to coil 28A in boiler 26 to complete the water loop. After being preheated in coils 28A, the heated water is applied to drum 42 which supplies heated water to vaporizer coils 28B. Steam in drum 42 is applied to superheater coils 28C producing superheated steam that is applied via line 32 to turbine 34.

Power plant 12 can operate in a conventional manner on fossil fuel as a combined cycle power plant with power being supplied by generators 22 and 36. In order to reduce the consumption of fossil fuel by the power plant, retrofit equipment 11 is utilized. Being external to plant 12, equipment 11 requires no significant modification to plant 12 except for the provision of flow control 44 which is described below.

Equipment 11 includes auxiliary gas turbine unit 13A including auxiliary compressor 14A for compressing ambient air to produce compressed air, and solar collector 15A that receives the compressed air and heats the same to produce heated compressed air which is applied to auxiliary turbine 20A coupled to auxiliary compressor 14A and to auxiliary generator 22A. Turbine 20A expands the heated compressed air and drives the auxiliary compressor and the auxiliary generator thereby producing power and hot exhaust gases in line 24A. Flow control 44 selectively connects line 27 to either line 24 or to line 24A at node 25. When solar insolation is available, flow control 44 connects line 24A to line 27, and hot exhaust gases from retrofit equipment 11 are supplied to boiler 26. During cloudy days or inclement weather, or during the night, flow control 44 connects line 24 to line 27, and hot exhaust gases from gas turbine unit 13 are are supplied to boiler 26.

To provide short-term backup for the operation of retrofit equipment 11 during intermittently cloudy weather, etc., auxiliary burner 16A may be interposed between solar collector 15A and turbine 20A. Burner 16A is supplied with fossil fuel and operated only as needed during operation of unit 13A. However, in certain cases,when needed, or necessary, or when the equipment makes it possible, both primary gas turbine unit 13 and auxiliary gas turbine unit 13A can be used simultaneously.

Figure 2:
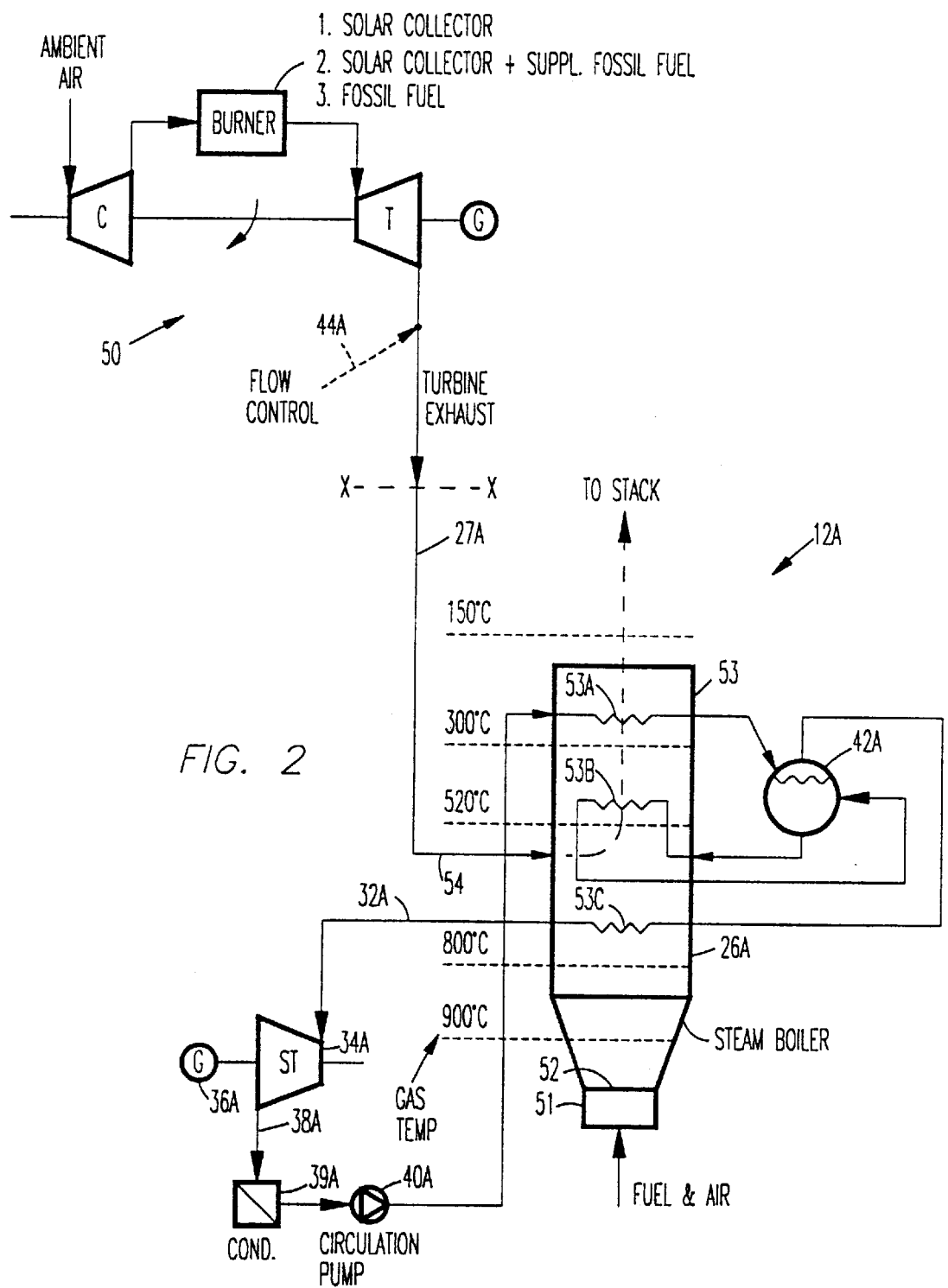
FIG. 2 is a schematic block diagram showing a modification of the steam generating apparatus shown in FIG. 1.

Power plant 12A in FIG. 2, which uses a fossil-fueled steam boiler, can be used in place of power plant 12 in FIG. 1, which uses a waste heat boiler. Reference numeral 50 in FIG. 2 designates gas turbine units like that shown in FIG. 1 but shows these units schematically upstream of the designator X—X in exhaust line 27A. That is to say, the apparatus in FIG. 2 downstream of designator X—X can be substituted for the apparatus in FIG. 1 downstream of the designator X—X in FIG. 1.

Power plant 12A in FIG. 2 includes a fossil-fueled boiler in the form of conduit 26A having a series of heat exchanger coils 53A, 53B, and 53C containing water and receiving both the hot exhaust gases in line 27A, which corresponds to line 27 in FIG. 1, and hot flue gases produced by the burning of fossil fuel in combustion chamber 51. The hot flue gases enter conduit 26A at its upstream end 52 and flow successively through the heat exchanger coils in conduit 26A to downstream end 53 through which heat-depleted flue gases pass before being vented to the atmosphere. After exiting the boiler, the then heat-depleted gases are vented to the atmosphere. Treatment of these cooled gases for environmental purposes may take place before venting.

Vaporization of water in the heat exchange coils takes place in a single stage, or multiple stages as shown, producing steam in line 32A which is applied to steam turbine 34A coupled to generator 36A. Turbine 34A expands the steam and drives generator 36A producing power from the generator and expanded steam from the turbine exhaust in line 38A. Condenser 39A condenses the expanded steam to condensate; and pump 40A returns the condensate to coil 53A in the boiler to complete the water loop. After being preheated in coils 53A, the heated water is applied to drum 42A which supplies heated water to vaporizer coils 53B. Steam in drum 42A is applied to superheater coils 53C producing superheated steam that is applied via line 32A to turbine 34A.

Heat extracted from the hot flue gases interacting with the heat exchanger coils in conduit 26A introduce a temperature gradient in the flue gases flowing in the conduit. This gradient is suggested by the broken lines indicated flue gas temperature at various axially displaced places along the flow path of the gases in the conduit.

Means 54 introduce the hot exhaust gases in line 27A into conduit 26A at an axial location where the temperature of the flue gases is approximately the same as the temperature of the hot exhaust gases. Thus, beyond the point at which the exhaust gases from the turbines are introduced into conduit 26A, both the exhaust gases and the flue gases contribute to the heating of water in the heat exchanger coils. However, when using a duct burner below designation X—X in line 27A, for example, the hot gases produced can be added to the entrance of boiler 26A near upstream end 52.

Flow control 44A selectively connects line 27A to the exhaust line of either the solar turbine of the fossil-fueled turbine that are contained in apparatus 50 depending on the solar insolation situation. When solar insolation is available, flow control 44A connects hot exhaust gases from the solar powered gas turbine unit in the retrofit equipment to boiler 26A. During cloudy days or inclement weather, or during the night, flow control 44A connects hot exhaust gases from the fossil-fueled gas turbine unit to boiler 26A. Also, if a burner is included in the solar powered gas turbine unit (as shown in FIG. 1), the burner can be used during short periods of cloudy weather, etc.

Figure 3:
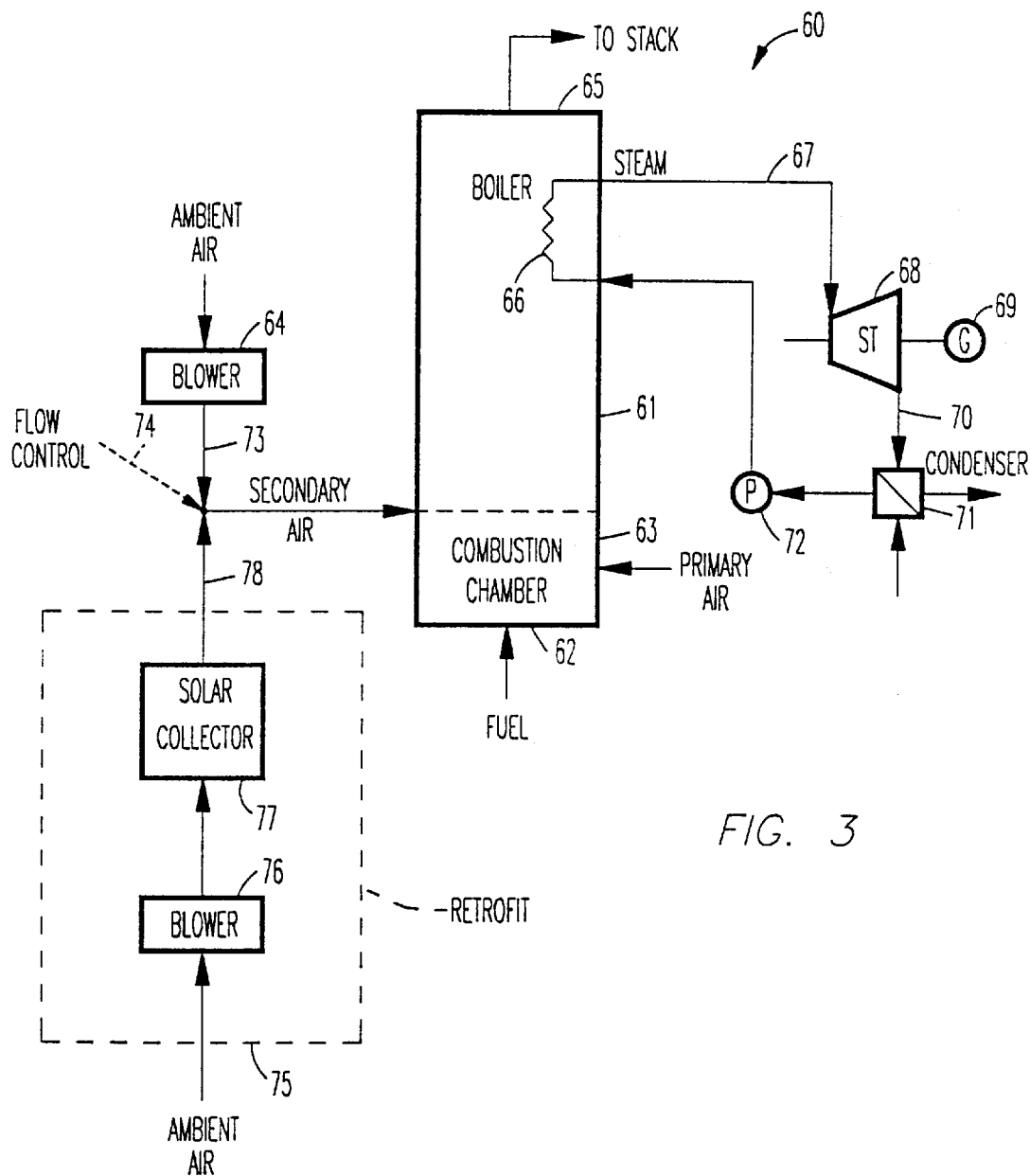
FIG. 3 is a schematic block diagram of a further embodiment of the present invention.

A further embodiment of retrofit equipment for reducing the consumption of fossil fuel by a power plant during solar insolation is shown in FIG. 3 to which reference is now made. Power plant 60 includes a boiler having conduit 61 at whose upstream end 62 is combustion chamber 63 adapted to receive fossil fuel and primary air for burning the fuel and producing combustion products. Primary blower 64 supplies pressurized ambient air to line 73 through which secondary air can be introduced into the combustion chamber by flow control 74 of retrofit equipment 75. Hot flue gases produced in the combustion chamber pass in heat exchange contact with coils 66 in the boiler before flowing into upstream end 65 of the boiler. Heat depleted flue gases exit upstream end 65 and are vented to the atmosphere.

Heat exchanger coils 66 contain water and are positioned in the conduit so as to transfer heat in the flue gases to the water producing steam in line 67. Steam turbine 68 coupled to generator 69 expands the steam in line 67 and drives the generator producing power and expanded steam in line 70. Condenser 71 condenses the expanded steam into condensate which is returned by pump 72 to coils 66.

In addition to flow control 74, retrofit equipment 75 also includes secondary blower 76 which pressurizes ambient air that is supplied to solar collector 77. During solar insolation, the pressurized ambient air supplied by blower 76 is heated in collector 77 and supplied to line 78. Flow control 74 serves as means for selectively connecting either line 73 or line 78 to the combustion chamber whereby heated ambient air from retrofit equipment 75 can be supplied to the combustion chamber when solar insolation is available thereby reducing the consumption of fossil fuel. In either case, for environmental reasons, treatment of the cooled gases exiting upstream end 65 may take place before atmospheric venting.

Figure 4:
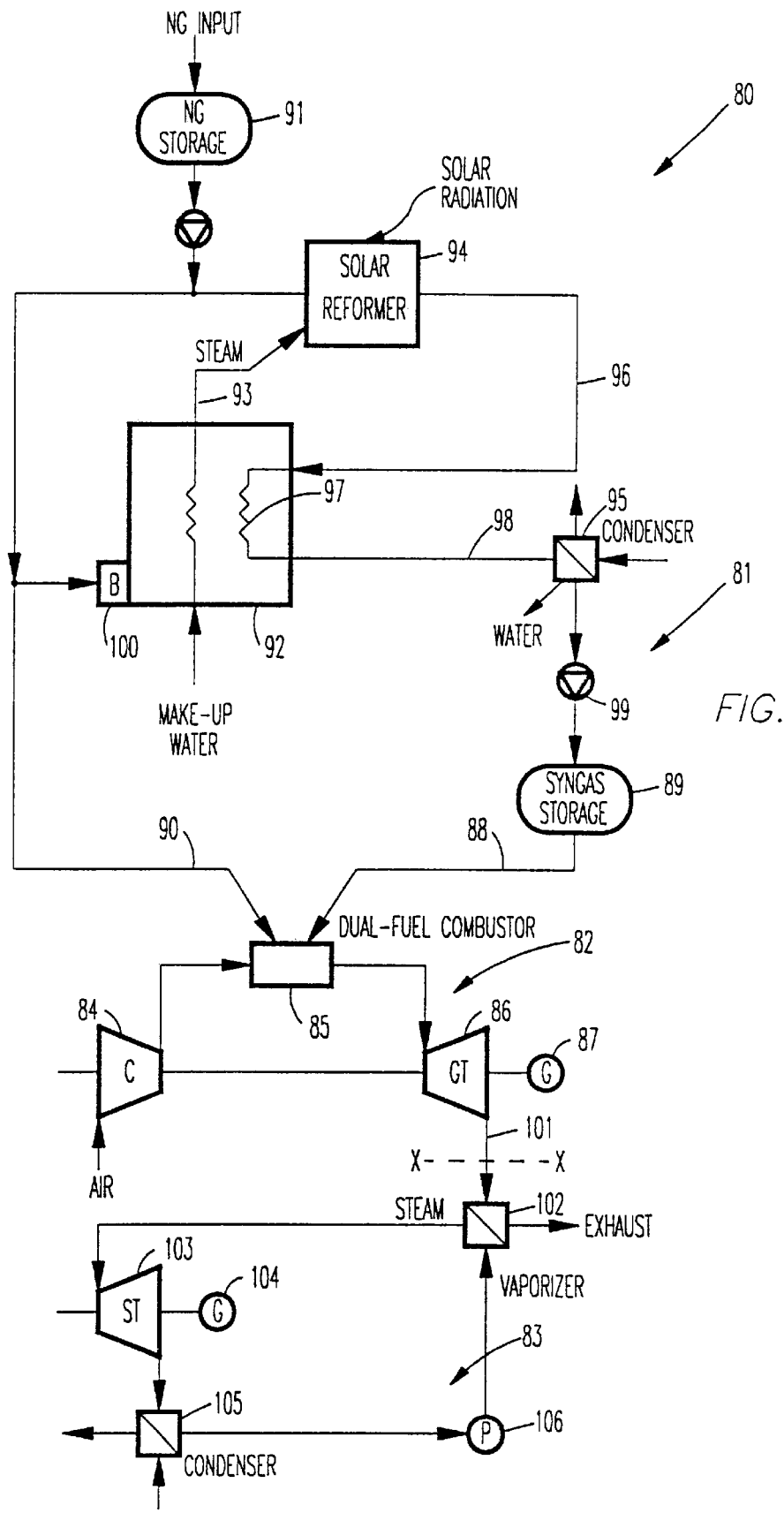
FIG. 4 is a schematic block diagram of still another embodiment of the present invention.

The present invention also includes power plant 80 for generating power using synthetic gas as shown in FIG. 4. Power plant 80 includes solar reformer apparatus 81, gas turbine unit 82, and steam turbine unit 83. Reformer apparatus 81 is equipment constructed and arranged to reform a hydrocarbon gas from a source into synthetic gas. Reforming actually refers to the use of heat for driving an endothermic chemical reaction between a hydrocarbon feedstock and steam or $CO_2$ in the presence of a catalyst. The result or products of such reaction is a mixture of hydrogen and carbon monoxide, and often, residual amounts of the feedstock. Such mixture is commonly referred to as synthetic gas or syngas. The feedstock to a reformer can be a gas such as natural gas, LNG, LPG, biogas produced from anaerobic digestion, landfill gas, gas produced from a fermentation process, gas produced from a pyrolysis system, gas produced from a gasification system, etc. The feedstock to the reformer, as well as to such gas producing systems, can also be a solid or liquid carbonaceous material such as coal, biomass, oil shale, oil residue, petcoke, asphaltenes, etc. The reformed hydrogen enriched syngas has about 30% higher heat energy than the original feedstock.

Gas turbine unit 82 includes compressor 84 for compressing air to produce compressed air, heater 85 for heating the compressed air to produce heated compressed air, and turbine 86 coupled to generator 87 and to the compressor for expanding the heated compressed air and producing power and hot exhaust gases in line 101. Heater 85 is designed to burn natural gas (NG) and syngas; and line 88 supplying syngas from storage tank 89, and line 90 supplying NG from storage tank 91 constitute means for supplying both syngas produced by apparatus 81 and NG from tank 91 to heater 85. Preferably, apparatus 81 utilizes solar radiation as a heat source in reforming NG into syngas. Reformer apparatus 81 includes boiler 92 for burning NG from storage 91 and producing steam in line 93, solar reformer 94 containing a catalyst and and condenser 95. Reformer 94 receives NG from storage tank 91, and is responsive to solar radiation and to steam from the boiler for reforming the NG into a precursor of syngas that exits the reformer in line 96.

Heat exchanger 97 associated with boiler 92 adds heat to boiler 92 and permits the reduction, or termination of the heat supplied by the burner 100. Water vapor in the syngas is extracted in condenser 95 and the dried syngas is supplied to pump 99 which delivers the syngas to storage tank 89.

During periods of solar insolation, apparatus 81 converts NG from a source to syngas which is stored in tank 89.

Depending upon the flow rate of NG into storage tank 91, the sizes of storage tanks 89 and 91, the fuel consumption of turbine 86, and the amount of solar insolation, operation of gas turbine unit 82 may be sustained by supplying only syngas to heater 85. However, for practical reasons, it is preferred to provide NG backup for operation of the power plant. Thus, NG is supplied to burner 100 that fires boiler 92 of apparatus 81 as well as to line 90 that supplied NG to heater 85.

As shown in FIG. 4, apparatus 81 includes vaporizer 102 containing water and responsive to hot exhaust gases in line 101 for producing steam, and steam turbine 103 coupled to generator 104 for expanding steam produced by the vaporizer and producing power and expanded steam. The expanded steam is condensed in condenser 105 to condensate which pump 106 returns to the vaporizer.

Vaporizer 102 in FIG. 4 may take various forms; and designator X—X in FIG. 4 denotes a symbolic separator that indicates a connection to any one of several devices operating on exhaust gases from a turbine. For example, a waste heat boiler like that shown in FIG. 1 below the designator X—X could be used, or a steam boiler like that shown in FIG. 2 below the designator X—X could be used.

In a further embodiment, a power plant can be retrofitted as shown in FIG. 1 with the fuel for the burner being supplied from a syngas storage. In this embodiment, the syngas can be produced using one of the many methods for producing syngas from carbonaceous material, e.g., the syngas can be produced using a solar reformer of the type disclosed with reference to FIG. 4 with the syngas being supplied from syngas storage 89 shown in FIG. 4.

In the embodiments of the present invention, rather than using the steam produced to operate a steam turbine, the steam or portion thereof can be used for process heating or in other cogeneration processes.

In addition, although the above description describes the present invention in terms of retrofit equipment, the present invention as disclosed in the above described embodiments can be used for producing power in new power plants as well.

While the above description uses the term retrofit, it should be understood that this term is used herein to include the addition of solar energy systems of the type disclosed above to existing systems. In addition, such term is used herein to include the actual improvement of power plant components such a boiler, a combustion chamber associated with a boiler, etc.

In situations where gas pipelines pass through a region where solar insolation is relatively high, the present invention can be used for solar reforming some or all of the gas to syngas. The thus produced syngas can be added to the gas flowing in the pipeline, and/or can be directed to a gas turbine unit, or a combined cycle power plant associated with the solar reformer for producing electricity.

It is believed that the advantages and improved results furnished by the method and apparatus of the present in are apparent from the foregoing description of the invention. Various changes and modifications may be made without departing from the spirit and scope of the invention as described in the claims that follow.

What is claimed is:

1. Retrofit equipment that reduces the consumption of fossil fuel by a power plant using solar insolation, said power plant comprising:

a) a primary gas turbine unit including a primary compressor that compresses ambient air to produce compressed air, a combustor that receives said compressed air for burning fossil fuel and heating said compressed air to produce heated compressed air, and a primary turbine coupled to said primary compressor that expands said heated compressed air and drives said primary compressor thereby producing power and hot exhaust gases;

b) a boiler having heat exchanger coils containing water and receiving said hot exhaust gases that vaporizes water in said coils and produces steam and heat-depleted exhaust gases that are vented via a stack to the atmosphere;

c) a steam turbine that expands steam produced by said boiler and produces power and expanded steam;

d) a condenser that condenses said expanded steam to condensate; and e) a pump that returns said condensate to said boiler; and f) said retrofit equipment comprising an auxiliary gas turbine unit including an auxiliary compressor that compresses ambient air to produce compressed air, a solar collector that receives said compressed air for heating the same to produce heated compressed air, and an auxiliary turbine coupled to said auxiliary compressor that expands said heated compressed air and drives said auxiliary compressor producing power and further hot exhaust gases such that the hot exhaust gases are selectively supplied from said retrofit equipment to said boiler when solar insolation is available.

2. Apparatus according to claim 1 wherein said boiler includes a conduit having an upstream end that receives said hot exhaust gases which flow through said conduit to a downstream end through which the gases are vented to the atmosphere.

3. Apparatus according to claim 1 wherein said boiler includes:

a) a combustion chamber that burns fuel and produces hot flue gases, and a conduit having an upstream end that receives said flue gases which flow through said conduit to a downstream end through which said flue gases are vented to the atmosphere; and b) heat exchanger coils in said conduit that heats said steam condensate and produces steam that is supplied to said steam turbine and introduces a temperature gradient in said flue gases flowing in said conduit whereby said hot exhaust gases are introduced into said conduit at a location where the temperature of the flue gases is approximately the same as the temperature of the hot exhaust gases.

4. Retrofit equipment for reducing the consumption of fossil fuel by a power plant using solar insolation, said power plant comprising:

a) a gas turbine unit including a compressor for compressing air to produce compressed air, a heater for heating said compressed air to produce heated compressed air, and a turbine coupled to a generator and to said compressor for expanding said heated compressed air and producing power and hot exhaust gases;

b) a waste heat boiler having heat exchanger coils containing water and receiving said hot exhaust gases for vaporizing water in said coils and producing steam;

c) a steam turbine for expanding steam produced by said waste heat boiler and producing power and expanded steam;

d) a condenser for condensing said expanded steam to condensate; and e) a pump for returning said condensate to said waste heat boiler;

f) retrofit equipment including a compressor for compressing ambient air to produce compressed air, a solar receiver for receiving solar radiation and heating said compressed air to produce heated compressed air, and a turbine coupled to a generator for expanding said heated compressed air and driving said compressor and generator thereby producing power and further hot exhaust gases; and g) flow control means for selectively supplying the further hot exhaust gases from said retrofit equipment to said boiler when solar insolation is available.

5. Apparatus according to claim 4 including:

means for combining the hot exhaust gases from said gas turbine unit and said retrofit equipment and supplying such gases to said waste heat boiler;

wherein said heater in said gas turbine unit is a burner adapted to receive and burn fuel.

6. A method for retrofitting a power plant which reduces the consumption of fossil fuel using solar insolation, said method comprising the steps of:

a) retrofitting the power plant by adding a solar receiver to the power plant which receives solar radiation and heats compressed air compressed in a compressor and produces heated, compressed gas;

b) supplying the heated, compressed gas to a gas turbine coupled to a generator which expands the heated, compressed gas and drives the compressor and generator thereby producing power and from which hot exhaust gases are extracted;

c) utilizing heat contained in the hot exhaust gases to heat and vaporize water contained in heat exchanger coils of a waste heat boiler and thereby, producing steam and heat-depleted exhaust gases that are vented to the atmosphere;

d) expanding the steam in a steam turbine thereby producing power and from which expanded steam is extracted;

e) condensing the expanded steam in a steam condenser thereby producing steam condensate;

f) pumping the steam condensate to the waste heat boiler; and g) compressing ambient air in a further compressor, supplying the compressed air in a combustor which produces hot gases, expanding the hot gases in a further turbine which produces power and from which heated exhaust gases are produced, and combining said heated, exhaust gases with said hot exhaust gases.

7. A method according to claim 6 including supplying the combined exhaust gases to said waste heat boiler.

* * * * *